United States Patent
Ando et al.

(10) Patent No.: US 7,762,151 B2
(45) Date of Patent: Jul. 27, 2010

(54) LOAD DETECTION DEVICE

(75) Inventors: Mitsuhiro Ando, Toyohashi (JP);
Hiroyuki Tanaka, Nagoya (JP);
Shunsuke Kogure, Toyota (JP);
Kazuhiko Oshima, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/366,201

(22) Filed: Feb. 5, 2009

(65) Prior Publication Data

US 2009/0199658 A1   Aug. 13, 2009

(30) Foreign Application Priority Data

Feb. 13, 2008 (JP) .............................. 2008-032423

(51) Int. Cl.
*G01L 1/02* (2006.01)
(52) U.S. Cl. .................................. 73/862.59
(58) Field of Classification Search .............. 73/862.59, 73/862.041, 862.626, 778
See application file for complete search history.

(56) References Cited

U.S. PATENT DOCUMENTS

| | | | | |
|---|---|---|---|---|
| 4,354,132 A | * | 10/1982 | Borburgh et al. | 310/334 |
| 4,356,422 A | * | 10/1982 | van Maanen | 310/322 |
| 6,326,563 B1 | * | 12/2001 | Takeuchi et al. | 177/210 FP |
| 7,409,868 B2 | | 8/2008 | Ando et al. | |

FOREIGN PATENT DOCUMENTS

| JP | 2000-230853 | 8/2000 |
|---|---|---|
| JP | 2006-258693 | 9/2006 |

* cited by examiner

*Primary Examiner*—Jewel Thompson
(74) *Attorney, Agent, or Firm*—Oblon, Spivak, McClelland, Maier & Neustadt, L.L.P.

(57) ABSTRACT

A load detection device includes a piezoelectric body unit adapted to be deformed by receiving an electric voltage, the piezoelectric body unit generating an electric charge by receiving an external load, a drive portion applying the electric voltage to the piezoelectric body unit for vibrating thereof, a detection portion detecting the electric charge generated at the piezoelectric body unit, and an adjusting member adjusting a pressure applied to at least one pressure sensing surface provided at the piezoelectric body unit to restrain the vibration of the piezoelectric body unit.

13 Claims, 3 Drawing Sheets

LOAD DETECTION DEVICE

CROSS REFERENCE TO RELATED APPLICATIONS

This application is based on and claims priority under 35 U.S.C. § 119 to Japanese Patent Application 2008-032423, filed on Feb. 13, 2008, the entire contents of which is incorporated herein by reference.

FIELD OF THE INVENTION

The present invention relates to a load detection device which detects a load of an externally applied force by means of a piezoelectric effect.

BACKGROUND

JP2000-230853A discloses a known load detection device applying a piezoelectric effect, which includes a first piezoelectric element serving as a vibration generating portion, a second piezoelectric element serving as a vibration detecting portion which is disposed adjacent to the first piezoelectric element, a vibration detecting means, a vibration characteristics calculating means, and a load calculating means. According to the known load detection device, the vibration characteristics calculating means calculates characteristics of a vibration which is propagated by the vibration of the first piezoelectric element, and the load calculating means calculates the applied load on the basis of an output signal from the vibration characteristics calculating means.

According to the above-described known load detection device, two types of piezoelectric elements including the piezoelectric element serving as the vibration generating portion and the piezoelectric element serving as the vibration detecting portion are provided. According to another known load detection device, for example, disclosed in JP2006-258693A, a single piezoelectric element is commonly applied as the vibration generating portion and the vibration detecting portion. The load detection device disclosed in JP2006-258693A includes a piezoelectric element generating a vibration and detecting the vibration, a drive portion which outputs a drive signal for vibrating the piezoelectric element, a vibration detecting portion which extracts a detection signal from the piezoelectric element and detects a vibration characteristics value of the piezoelectric element on the basis of the extracted detection signal, and a calculation portion which calculates a load applied to the piezoelectric element on the basis of the vibration characteristics value from the vibration detecting portion. In those circumstances, a superimposed signal which is formed by superimposing the drive signal from the drive portion and the detection signal from the piezoelectric element is transmitted to the vibration detecting portion.

According to the known load detection devices in which the piezoelectric effect is applied, a change of the output signal from the piezoelectric element is susceptible not only to an influence of vibration characteristics of the piezoelectric element to which a load is applied by an object to be measured but also to an influence of characteristics of the object to be measured which is in contact with a pressure sensing surface of the piezoelectric element, particularly to an influence of an applied state of a pressure applied to the pressure sensing surface. A load detection performance is influenced to be unstable by the latter, depending on the characteristics of the object to be measured which is in contact with the pressure sensing surface of the piezoelectric element, particularly, depending on the applied state of the pressure applied to the pressure sensing surface. The foregoing drawback is caused to both structures, a structure in which separate piezoelectric elements have a vibration generating function and a vibration detecting function, respectively, and a structure in which a single piezoelectric element has a vibration generating function and a vibration detecting function.

A need thus exists for a load detection device which is not susceptible to the drawback mentioned above.

SUMMARY OF THE INVENTION

In light of the foregoing, the present invention provides a load detection device, which includes a piezoelectric body unit adapted to be deformed by receiving an electric voltage, the piezoelectric body unit generating an electric charge by receiving an external load, a drive portion applying the electric voltage to the piezoelectric body unit for vibrating thereof, a detection portion detecting the electric charge generated at the piezoelectric body unit, and an adjusting member adjusting a pressure applied to at least one pressure sensing surface provided at the piezoelectric body unit to restrain the vibration of the piezoelectric body unit.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
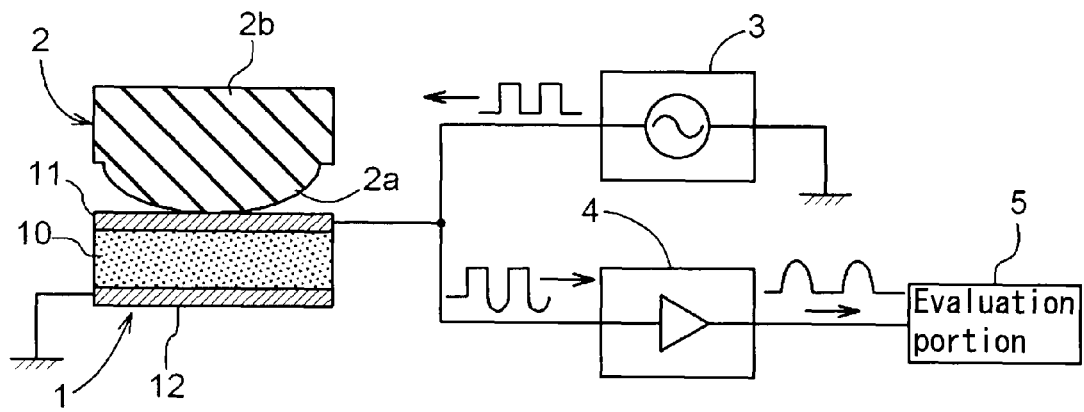
FIG. 1 is a view schematically illustrating a load detection device according to a first embodiment of the present invention.

Embodiments of the present invention will be described with reference to FIGS. 1-9 as follows. As shown, in FIG. 1, a load detection device includes a piezoelectric body unit 1, an adjusting member 2 which is attached to the piezoelectric body unit 1, a drive portion 3 which drives the piezoelectric body unit 1, a detection portion 4 which detects an electric signal obtained from the piezoelectric body unit 1, and an evaluation portion 5 which evaluates a detection signal from the detection portion 4.

The piezoelectric body unit 1 includes a piezoelectric body 10 formed in a sheet, and first and second electrode surfaces 11, 12 which are formed on surfaces of the piezoelectric body 10, respectively. In order to construct the piezoelectric body into a flexible sheet, or a film, a high molecular compound piezoelectric material, for example, polyvinylidene fluoride is applicable as a piezoelectric body material. A material for the piezoelectric body is not limited to the polyvinylidene fluoride, and any material is applicable as long as exhibiting a piezoelectric effect. For example, an electric material is applicable as the piezoelectric body. By generating an electric charge in response to a strain displacement of the piezoelectric body 10 based on the application of an external force (load) to the first and second electrode surfaces 11, 12, an electric current generated between the first electrode surface 11 and the second electrode surface 12 is attained. Namely, the first and second electrode surfaces 11, 12 serve as pressure sensing surfaces. Further, in the event that an electric voltage is applied between the first electrode surface 11 and the second electrode surface 12, a strain displacement is generated at the piezoelectric body 10, and for example, by repeatedly applying the electric voltage between the first electrode surface 11 and the second electrode surface 12, the first electrode surface 11 and the second electrode surface 12 (the piezoelectric body 10) are vibrated.

According to the first embodiment, the adjusting member 2 made from an elastic material is attached to a pressure sensing surface 11 which also serves as the first electrode surface 11. A bottom portion 2a which is in contact with the pressure sensing surface 11 of the adjusting member 2 is formed as a projecting portion extending from a top portion 2b thereof. According to this embodiment, the bottom portion 2a is configured in a round body, approximately in a dome shape, in which a cross-sectional dimension is increased as being away from the pressure sensing surface 11. Thus, in the event that a load of an object to be measured is applied to the top portion 2b of the adjusting member 2, a portion of the bottom portion 2a serving as a projecting portion which contacts or comes in contact with the pressure sensing surface 11 is deformed; thus changing contact dimensions. In those circumstances, the greater the applied load is, the greater a degree of the deformation of the contacting portion of the bottom portion 2a becomes. In consequence, the contact dimensions between the pressure sensing surface 11 and the adjusting member 2 is increased, and restraining effects to the strain displacement of the piezoelectric body 10 is increased. Accordingly, drawbacks that a load detection becomes unstable because a large force is locally applied to a portion of the pressure sensing surface 11 is restrained.

The drive portion 3 is electrically connected to one of the electrode surfaces, for example, to the first electrode surface 11 in order to apply the electric voltage to the piezoelectric body 10. The other electrode surface, the second electrode surface 12, is grounded. The detection portion 4 is electrically connected to the first electrode surface 11 in order to detect an electric current based on an electric charge generated in response to the strain displacement of the piezoelectric body 10 by the application of the external force. A signal generated in response to the strain displacement of the piezoelectric body 10, which is detected by the detection portion 4 is transmitted to the evaluation portion 5. The evaluation portion 5 calculates a load corresponding to a signal amplitude value obtained referring to a table, or the like, which shows a relationship between a load and a signal amplitude value.

The drive portion 3 generates a drive signal of a periodical pulse as schematically shown in FIG. 1. By transmitting the drive signal to the piezoelectric body unit 1, the drive portion 3 applies a drive electric voltage between the first electrode 11 and the second electrode 12. A cycle of the drive signal may be set to have a resonance frequency of the piezoelectric body 10 in order to efficiently strain-displace (vibrate) the piezoelectric body 10. For example, a drive signal of 20Vp-p is applied at 75 kHz, the frequency may be optimized depending on a level of the load to be detected and/or a precision of a detection.

Upon the transmission of the above-explained drive signal to the piezoelectric body unit 1, a superimposed signal in which the drive signal and a detection signal based on an electric charge generated at the piezoelectric body 10 by the drive signal is superimposed is inputted to the detection portion 4 as schematically illustrated in FIG. 1. The superimposed signal includes a drive signal including a square wave shaped pulse signal in a positive direction and a sine wave shaped half wave signal (detection signal) in a negative direction. Thus, the detection portion 4 extracts a half wave signal component from the superimposed signal, processes a necessary pre-transaction, and transmits the processed signal to the evaluation portion 5. More particularly, the drive signal corresponds to a repeating pulse having amplitude in a positive direction with a predetermined period. By the drive signal, the electric voltage is applied to the piezoelectric body 10 for a period (drive period) corresponding to a pulse width to strain-deform (vibrate) the piezoelectric body 10. In response to the strain deformation of the piezoelectric body 10 between a rising of the pulse to a falling of the next pulse, an electric charge is supplied to the electrode surfaces by means of the piezoelectric effect, thus to generate the detection signal.

Figure 2:
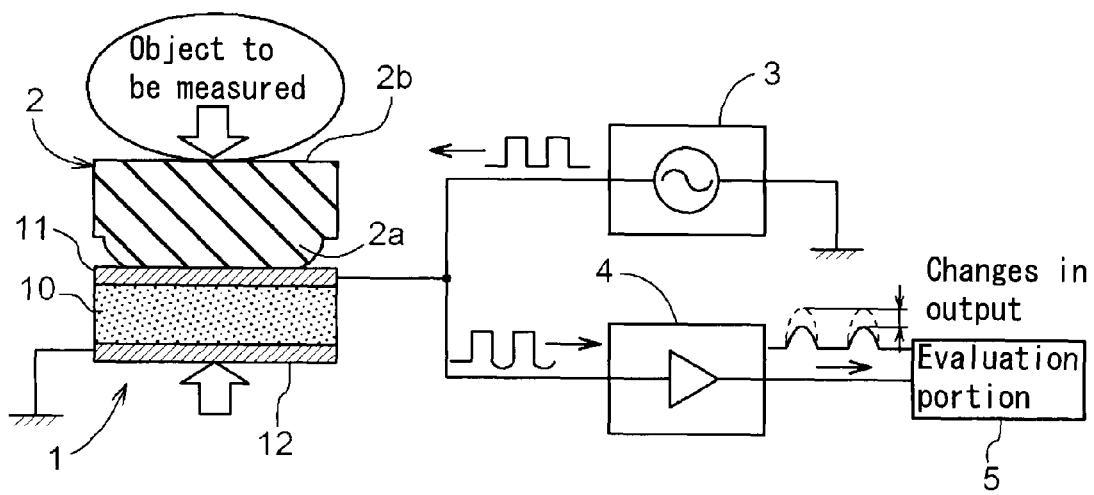
FIG. 2 is a view illustrating a state where a load (external force) is applied to the load detection device shown in FIG. 1.

As shown in FIG. 2, upon the application of the load of the object to be measured to the pressure sensing surface 11 of the piezoelectric body unit 1 via the adjusting member 2, a contact dimension of the pressure sensing surface 11 and the adjusting member 2 is increased, and the strain displacement of the piezoelectric body 10 is restrained. In consequence, the amount of electric charges supplied to the electrode surfaces by means of the piezoelectric effect is reduced, so that an amplitude value of the detection signal detected at the detection portion 4 is reduced.

Figure 3:
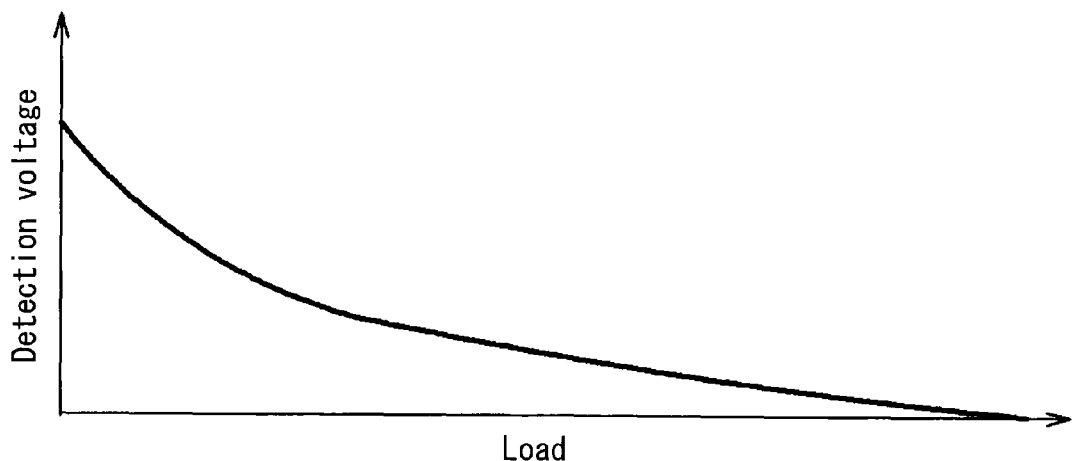
FIG. 3 is a graph illustrating an example of characteristics between a load and a detected electric voltage.

The greater the load applied to the piezoelectric body unit 1 is, the more restrained the strain displacement of the piezoelectric body 10 is, thus the amplitude value of the detection signal is reduced. An example of a relationship between the load applied to the piezoelectric body unit 1 and the amplitude value of the detection signal is shown in FIG. 3. A relationship between loads and amplitude values of detection signals experimentally and statistically calculated in advance is tabled and set in the evaluation portion 5.

A second embodiment of the present invention will be explained with reference to FIGS. 4-6. According to the first embodiment, a single piezoelectric body unit includes a vibration generating function and a vibration detecting function. However, the vibration generating function and the vibration detecting function may be performed by separate piezoelectric body units. A load detection device according to the second embodiment includes such piezoelectric body units 1A, 1B.

Figure 4:
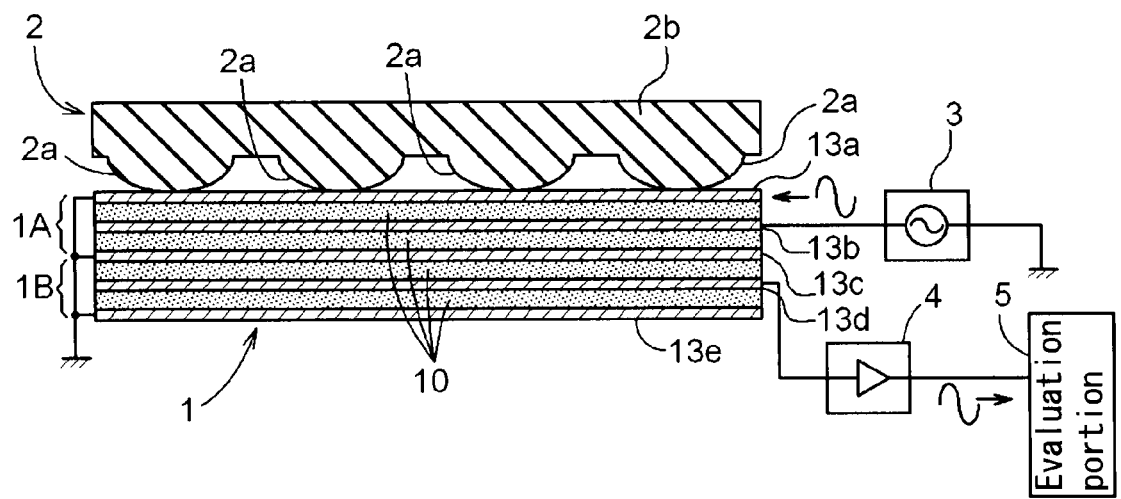
FIG. 4 is a view schematically illustrating a load detection device according to a second embodiment of the present invention.
Figure 5:
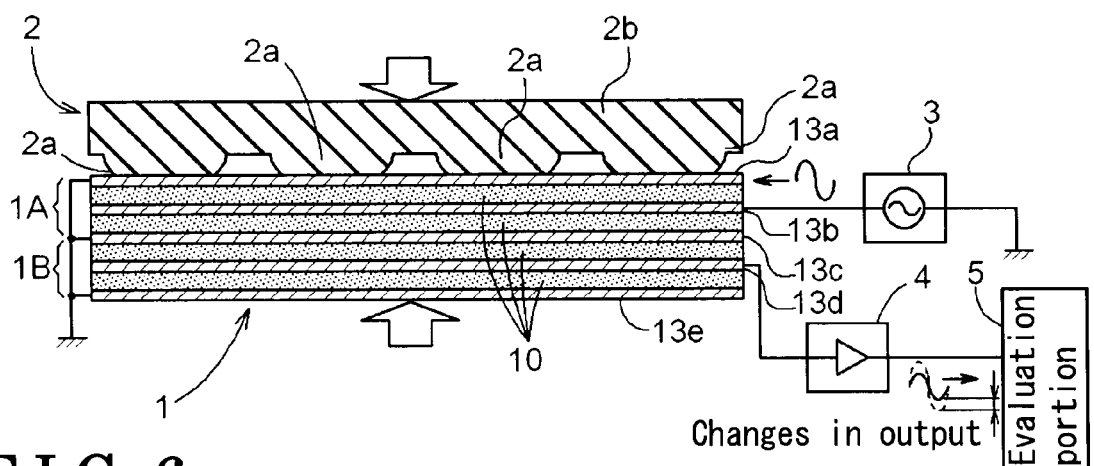
FIG. 5 is a view illustrating a state where a load (external force) is applied to the load detection device shown in FIG. 4.

As shown in FIG. 4, piezoelectric body units according to the second embodiment are formed by layering, for example, four layers of the piezoelectric body 10 which is made from a film made of a piezoelectric material (polyvinylidene fluoride) to form first to fifth electrode surfaces 13a to 13e on both sides of each layers. The layered structure includes, for example, two piezoelectric body unit, that is, the piezoelectric body units 1A, 1B. Namely, the second electrode surface 13b is positioned between two piezoelectric bodies 10 of the piezoelectric body unit 1A, and the first electrode surface 13a and the third electrode surface 13c are provided on the external sides of the piezoelectric bodies 10, respectively. Further, the fourth electrode surface 13*d* is positioned between two piezoelectric bodies 10 of the piezoelectric body unit 1B, and the third electrode surface 13*c* which is commonly used with the piezoelectric body unit 1A and the fifth electrode surface 13*e* are provided on the external sides of the piezoelectric bodies 10, respectively.

In the piezoelectric body unit 1A, the second electrode surface 13*b* is electrically connected to the drive portion 3 so that the piezoelectric body unit 1A operates as the piezoelectric body driving unit 1A. In the piezoelectric body unit 1B, the fourth electrode surface 13*d* is electrically connected to the detection portion 4 so that the piezoelectric body unit 1B operates as the piezoelectric body detecting unit 1B. The first electrode surface 13*a*, the third electrode surface 13*c*, and the fifth electrode surface 13*e* are grounded. A detection signal based on a pressure fluctuation which the piezoelectric body 10 of the piezoelectric body detecting unit 1B receives due to the strain deformation (vibration) of the piezoelectric body 10 of the piezoelectric body driving unit 1A to which the electric voltage is applied by the drive signal is inputted to the detection portion 4. Accordingly, unlike the first embodiment, the detection portion 4 of the second embodiment does not need to perform a transaction to extract a detection signal from a superimposed signal.

Figure 6:
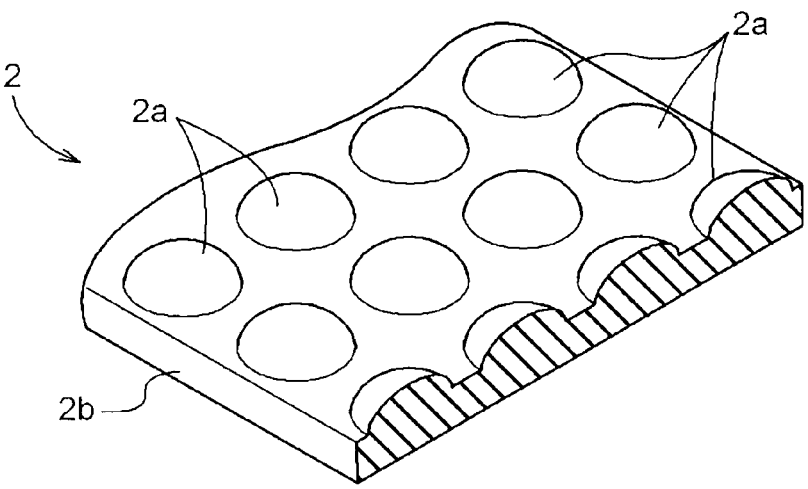
FIG. 6 is a perspective view illustrating an example of an adjusting member.

As shown in FIG. 6, according to the second embodiment, the bottom portion 2*a* of the adjusting member 2, which contacts or comes in contact with the pressure sensing surface 13*a* serving also as the first electrode surface, includes multiple projection portions which are evenly distributed. The adjusting member 2 is made from an elastic member, for example, made of urethane. Each of the projection portions is configured in a round body, approximately in a dome shape, in which a cross-sectional dimension is increased as being away from the first electrode surface 13*a* serving as the pressure sensing surface. Thus, in the event that a load of an object to be measured is applied to the top portion 2*b* of the adjusting member 2, a portion of the projecting portion which contacts or comes in contact with the pressure sensing surface is deformed. In those circumstances, as the greater load is applied, the contact dimensions of the projecting portion and the pressure sensing surface is increased. Namely, a ratio of a dimension of a portion of the piezoelectric body 10 where a strain displacement (vibration) of the piezoelectric body 10 of the piezoelectric body driving unit 1A excited by the drive signal from the drive portion 3 is limited and a ratio of a dimension of a portion of the piezoelectric body 10 where the strain displacement (vibration) is not limited changes, and the changes of the ratios affect the piezoelectric body detecting unit 1B which is integrally formed with the piezoelectric body driving unit 1A. In consequence, output characteristics of the detection signal from the piezoelectric body detecting unit 1B changes in response to the level of the external force (load) applied via the adjusting member 2. For example, in a case where a sine wave of 75 kHz and 20Vp-p is applied as the drive signal and the applied external force (pressure) to the piezoelectric unit via the adjusting member 2 changes from 0 to 60 kPa, the output electric voltage changes from 110 to 50 mVp-p.

Figure 7:
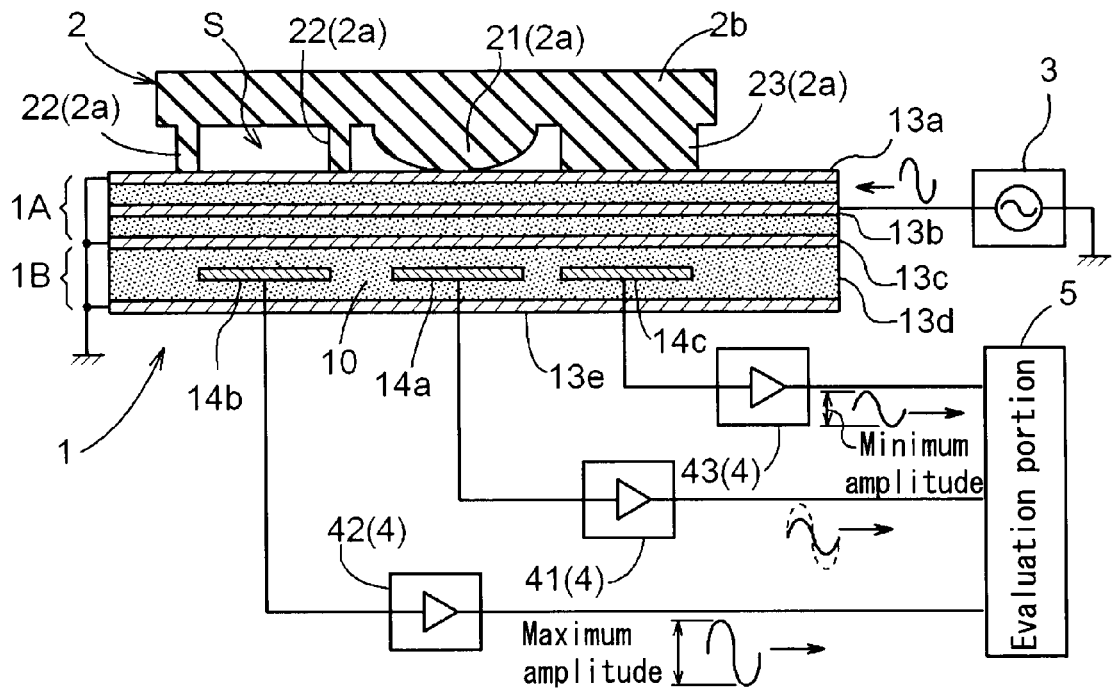
FIG. 7 is a view schematically illustrating a load detection device according to a third embodiment of the present invention.

A third embodiment, which is a modified example of the second embodiment, will be explained with reference to FIG. 7. According to the third embodiment, likewise the second embodiment, the piezoelectric body unit includes the piezoelectric body driving unit 1A and the piezoelectric body detecting unit 1B which are integrally formed. The load detection device of the third embodiment differs from the second embodiment in a structure that the fourth electrode surface 13*d* connected to the detection portion 4 is divided into three portions. Particularly, the fourth electrode surface 13*d* from which the detection signal of the piezoelectric body detecting unit 1B is received is divided into a first electrode surface segment 14*a*, a second electrode surface segment 14*b*, and a third electrode surface segment 14*c*. Further, the bottom portion 2*a* of the adjusting member 2 is divided into three separate members, which are: a first projecting portion 21 which is positioned above the first electrode surface segment 14*a*, a second projecting portion 22 which is positioned above the second electrode surface segment 14*b*, and a third projecting portion 23 which is positioned above the third electrode surface segment 14*c*. The first projecting portion 21 exhibits an approximately dome shape whose contact dimension with the pressure sensing surface (first electrode surface) 13*a* changes in response to the application of the load of the object to be measured to the top portion 2*b* of the adjusting member 2 and is positioned over, or right above the first electrode surface segment 14*a*. The second projecting portion 22 is positioned surrounding space S having approximately the same dimension with the second electrode surface segment 14*b* for creating the space S above a portion of the pressure sensing surface (first electrode surface) 13 which is positioned over, or right above the second electrode surface segment 14*b*. The third projecting portion 23 includes a configuration whose entire area which faces the pressure sensing surface (first electrode surface) 13*a* is in contact with an area of the pressure sensing surface 13*a* positioned over, or right above the third electrode surface segment 14*c* irrespective of whether or not the load is applied to the adjusting member 2. By contacting the entire surface of the third projecting portion 23 to a portion (region) of the pressure sensing surface 13*a* facing thereto, an output of a detection voltage corresponding to a case where the entire surface is in contact with the pressure sensing surface 13*a* (i.e., corresponding to a maximum output of the detection voltage when considering as a ratio) and an output of a detection voltage corresponding to a case where the projecting portion is not in contact with the pressure sensing surface 13*a* (i.e., corresponding to a minimum output of the detection voltage when considering as a ratio) can be compared to an output corresponding to a case where the first projecting portion 21 is in contact with portion (region) of the pressure sensing surface 13*a*. Accordingly, by always contacting the entire surface of the third projecting portion 23 to the predetermined region or portion of the pressure sensing surface 13*a*, the load can be detected accurately.

According to the foregoing construction of the adjusting member 2, non-acting sectional surfaces at which a contact state between the adjusting member 2 and the pressure sensing surface 13*a* do not change and acting sectional surfaces at which a contact state between the adjusting member 2 and the pressure sensing surface 13*a* changes in response to the external force applied via the adjusting member 2 are formed. A electric signal received from the first electrode surface segment 14*a* corresponding to the acting sectional surface serves as the detection signal corresponding to the applied load. An electric signal received from the second electrode surface segment 14*b* and the third electrode surface segment 14*c* corresponding to the non-acting sectional surfaces serves as a reference signal. The reference signal received from the second electrode segment 14*b* is a no load (zero point adjustment) reference signal which is not affected by the load applied by the adjusting member 2. The reference signal received from the third electrode surface segment 14*c* is a maximum load reference signal which corresponds to a maximum load applied to the adjusting member 2. By the application of the no load reference signal and the maximum load reference signal, an output range of the detection signal is defined, which enables accurate load detection by means of an accurate calibration. As the reference signal, it is favorable that the no load reference signal and the maximum load reference signal are obtained. However, only one of the no load reference signal and the maximum reference signal may be applied. A structure of the piezoelectric body unit 1 and a structure of the adjusting member 2 may be conformed to each other in accordance with a desired reference signal.

Because the detection signal, the no load reference signal and the maximum load reference signal are transmitted from the piezoelectric body detecting unit 1B to the detection portion 4, the detection portion 4 according to the third embodiment includes a first detection portion 41, a second detection portion 42, and a third detection portion 43. The first detection portion 41 inputs the detection signal received from the first electrode surface segment 14a. The second detection portion 42 inputs the no load reference signal received from the second electrode surface segment 14b. The third detection portion 43 inputs the maximum load reference signal received from the third electrode surface segment 14c.

Figure 8:
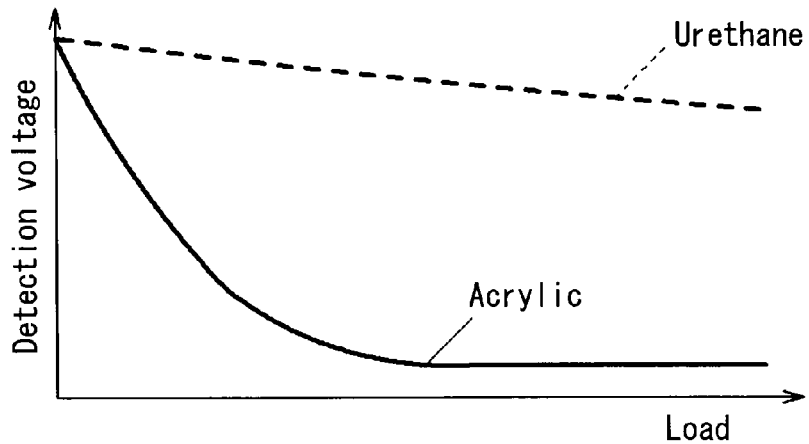
FIG. 8 is a graph showing an example of characteristics between a load and a detected electric voltage of an adjusting member made of different materials.

According to the embodiments explained above, an elastic member is applied as a material for the adjusting member 2 and the bottom portion 2a is configured as a projecting portion. However, the material for the adjusting member 2 is not limited to the elastic member. Further, instead of being formed as a projecting portion, the bottom portion 2a may adopt a structure which dispersedly applies the force to the pressure sensing surface in response to the level of the load applied by contacting entire surface thereof to the pressure sensing surface. A relationship of a load relative to a detection voltage when applying different materials for the adjusting member 2 is illustrated in FIG. 8. As shown in FIG. 8, a dotted line shows a case where a urethane material is applied as the adjusting member 2, which shows a stable linear characteristics whose rate of change is small relative to a load range in view of a broad range. A solid line in FIG. 8 shows a case where an acrylic material is applied as the adjusting member 2, which shows high rates of change within a lower load range in which load detection with high precision can be expected. As explained above, because a relationship of the detection voltage relative to the load differs depending on materials applied to the adjusting member 2, an optimum material should be chosen according to a level of load to be measured.

Figure 9:
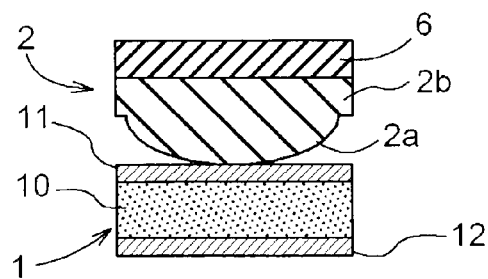
FIG. 9 is a view schematically showing an example of an adjusting member which includes a layer having a high rigidity.

As a modified example, as shown in FIG. 9, a high rigidity layer (serving as a receiving portion) 6 may be disposed on the top portion 2b of the adjusting member 2. By determining a rigidity of the high rigidity layer 6 to be higher than a rigidity of the adjusting member 2, the load from the object to be measured can be applied to the adjusting member 2 more evenly so as to contribute to stabilize the load detection. The high rigidity layer 6 may be provided as a separate member from the adjusting member 2 or may be integrally formed. For example, the adjusting member 2 and the high rigidity layer 6 may be integrally formed by applying a co-injection molding method, or double molding method, or the like.

According to the construction of the embodiments, the force applied to the pressure sensing surface 11, 13a of the piezoelectric body unit 1 by the object to be measured is not directly acted thereon, however, is acted thereon via the adjusting member 2. The adjusting member 2 adjusts an action of the force applied by the object to be measured to an acting state of the force so that the piezoelectric body unit 1 generates a stable load signal to affect the adjusted acting force to the pressure sensing surface 11, 13a. For example, the piezoelectric body unit 1 includes a piezoelectric element provided at a center portion in a thickness direction thereof and electrodes 11, 12 or 13a-13d provided on surfaces of the piezoelectric element, respectively. When the external force acts on the piezoelectric body unit 1, the piezoelectric body 10 is compressively deformed within a certain range. Multiple numbers of dipoles which change operation states, or movements by the application of the external force or by excitation are arranged within the piezoelectric body. Because of the compressive deformation of the piezoelectric body 10, the freedom of the operation, or the movements of the dipoles is limited. In response to the extent of the limitation of the freedom of the operation of the dipoles, a vibration state of the piezoelectric body unit 1 based on the electric voltage applied from the drive portion 3 changes. By measuring the changes in the vibration state, the load of the object to be measured can be detected. The adjusting member 2 of the embodiments enables the accurate measurement of the load of the object to be measured by stabilizing the vibration state of the piezoelectric body unit 1 by transmitting the pressure adjusted in response to the level of the load of the object to be measured irrespective of the configuration of the object to be measured in the event that the external force is applied to the piezoelectric body unit 1. The load detection device according to the embodiment enables to detect the load stably utilizing the piezoelectric effects irrespective of the acting states of the force to the object to be measured.

With the construction of the load detection device according to the embodiments, the adjusting member 2 is made from an elastic member which changes a dimension to restrain the vibration of the piezoelectric body unit 1 in response to a degree of the applied external load.

The piezoelectric body unit 1 detects the load, basically, in the following manners. First, the load is detected by detecting the changes in outputs of the electric charges in response to the degree of the limitation of the operation, or the movements of the dipole disposed within the piezoelectric body unit 1. Second, the load is detected by detecting the changes in dimension of the region in which the operation of the dipole is restricted. Among the foregoing manners, changes, or fluctuation of the dimension of the region in which the operation of the dipole is restricted can set a variable of electric charges to be outputted greater. In other words, there are ranges for detecting the changes in applied load at respective regions of the piezoelectric body unit 1. According to the embodiments of the present invention, because the elastic member is applied as the adjusting member 2, for example, in the event that the object to be measured includes a pointed, or sharp portion, the concentration of the load applied to a particular portion is prevented, and the application of the load is dispersed to a predetermined range, or region of the piezoelectric body unit 1. In consequence, a drawback that a particular detection region of the piezoelectric body unit 1 is saturated because of the application of the excessive load is prevented. Further, by dispersing the applied load to as many regions as possible (as wide range as possible) while setting the load applied to the respective regions, or areas of the piezoelectric body 10 to be in a detectable range, a precision of the load detection is enhanced. In those circumstances, changing the dimension of area, or region which restricts the oscillation, or vibration of the piezoelectric body unit 1 in response to the degree of the load includes, for example, the following manners. Provided that the entire surface of the adjusting member 2 made from the elastic member is in contact with the piezoelectric body unit 1 and the object to be measured locally applies a load to a particular portion of the elastic member. In those circumstances, the load locally acted on the particular portion is transmitted to a wider region, or range of the adjusting member 2 by the deformation of the elastic member and the freedom of operation, or the movement of the dipole within the piezoelectric body unit 1 is limited in the regions, or ranges corresponding to the region, or the range of the adjusting member 2 which is in contact with the pressure sensing surface 11, 13a to generate a certain electric charge. As explained above, the structure of the adjusting member 2 is not limited, for example, due to initial state of the adjusting member 2 and the sensing surface 11, 13a either in contact with each other or not in contact with each other, as long as being able to change the dimension or area which restricts the oscillation, or vibration of the piezoelectric body unit 1.

With the construction of the load detection device according to the embodiments, the adjusting member 2 includes at least one projecting portion 2a arranged at the pressure sensing surface 11, 13a to contact the pressure sensing surface 11, 13a.

According to the structure of the embodiment, the load applied to the adjusting member 2 is distributed to the projecting portion 2a, and the contact dimension between the projecting portion 2a and the pressure sensing surface 11, 13a changes in response to the distribution of the load. The changes in the contact dimension brings the restriction of the strain displacement of the piezoelectric body unit 1. Accordingly, the above explained structure of the adjusting member 2 enables a stable load detection by the load detection device according to the embodiments of the present invention.

With the construction of the load detection device according to the embodiments, the projecting portion 2a is formed in a round configuration having a cross-sectional dimension being increased as being away from the pressure sensing surface 11, 13a.

According to the foregoing construction of the embodiments, a relationship between a load applied to the adjusting member 2 and a contact dimension of a projecting portion 2a relative to the pressure sensing surface 11, 13a assumes favorable, and thus a relationship between the load applied to the adjusting member 2 and a detection signal outputted from the piezoelectric body unit 1 assumes favorable. In consequence, a precision of the load detection is enhanced.

The load detection device according to the embodiments includes the receiving portion 6 having a higher rigidity than the adjusting member 2 and receiving the external load.

According to the foregoing construction of the embodiment, the load of the object to be measured can be evenly applied to the adjusting member 2. Accordingly, the applied load can be accurately measured irrespective of the configuration of the object to be measured.

With the construction of the load detection device according to the embodiment, the pressure sensing surface 13a is divided into a non-acting sectional surface in which a contact state between the adjusting member 2 and the pressure sensing surface 13a does not change irrespective of a degree of the external load and an acting sectional surface in which a contact state between the adjusting member 2 and the pressure sensing surface 13a changes in response to the degree of the external load applied via the adjusting member. In those circumstances, a detection signal from the non-acting sectional surface is applied as a reference signal when evaluating a detection signal from the acting sectional surface.

Electric signals received from the portion corresponding to the acting sectional surface serve as detection signals corresponding to the applied load. Further, electric signals received from the portion corresponds to the non-acting sectional surface serve as reference signals. Using the reference signals, accurate calibration of the piezoelectric body unit is performed, and thus accurate load detection is performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A load detection device, comprising:
   a piezoelectric body unit adapted to be deformed by receiving an electric voltage, the piezoelectric body unit generating an electric charge by receiving an external load;
   a drive portion applying the electric voltage to the piezoelectric body unit for vibrating thereof;
   a detection portion detecting the electric charge generated at the piezoelectric body unit; and
   an adjusting member adjusting a pressure applied to at least one pressure sensing surface provided at the piezoelectric body unit to restrain the vibration of the piezoelectric body unit.

2. The load detection device according to claim 1, wherein the adjusting member is made from an elastic member which changes a dimension to restrain the vibration of the piezoelectric body unit in response to a degree of the applied external load.

3. The load detection device according to claim 2, wherein the adjusting member includes at least one projecting portion arranged at the pressure sensing surface to contact the pressure sensing surface.

4. The load detection device according to claim 3, wherein the projecting portion is formed in a round configuration having a cross-sectional dimension being increased as being away from the pressure sensing surface.

5. The load detection device according to claim 1, further comprising:
   a receiving portion having a higher rigidity than the adjusting member and receiving the external load.

6. The load detection device according to claim 2, further comprising:
   a receiving portion having a higher rigidity than the adjusting member and receiving the external load.

7. The load detection device according to claim 3, further comprising:
   a receiving portion having a higher rigidity than the adjusting member and receiving the external load.

8. The load detection device according to claim 4, further comprising:
   a receiving portion having a higher rigidity than the adjusting member and receiving the external load.

9. The load detection device according to claim 1, wherein the pressure sensing surface is divided into a non-acting sectional surface in which a contact state between the adjusting member and the pressure sensing surface does not change irrespective of a degree of the external load and an acting sectional surface in which a contact state between the adjusting member and the pressure sensing surface changes in response to the degree of the external load applied via the adjusting member; and wherein
   a detection signal from the non-acting sectional surface is applied as a reference signal when evaluating a detection signal from the acting sectional surface.

10. The load detection device according to claim 2, wherein the pressure sensing surface is divided into a non-acting sectional surface in which a contact state between the adjusting member and the pressure sensing surface does not change irrespective of a degree of the external load and an acting sectional surface in which a contact state between the adjusting member and the pressure sensing surface changes in response to the degree of the external load applied via the adjusting member; and wherein
- a detection signal from the non-acting sectional surface is applied as a reference signal when evaluating a detection signal from the acting sectional surface.

11. The load detection device according to claim 3, wherein the pressure sensing surface is divided into a non-acting sectional surface in which a contact state between the adjusting member and the pressure sensing surface does not change irrespective of a degree of the external load and an acting sectional surface in which a contact state between the adjusting member and the pressure sensing surface changes in response to the degree of the external load applied via the adjusting member; and wherein
- a detection signal from the non-acting sectional surface is applied as a reference signal when evaluating a detection signal from the acting sectional surface.

12. The load detection device according to claim 4, wherein the pressure sensing surface is divided into a non-acting sectional surface in which a contact state between the adjusting member and the pressure sensing surface does not change irrespective of a degree of the external load and an acting sectional surface in which a contact state between the adjusting member and the pressure sensing surface changes in response to the degree of the external load applied via the adjusting member; and wherein
- a detection signal from the non-acting sectional surface is applied as a reference signal when evaluating a detection signal from the acting sectional surface.

13. The load detection device according to claim 5, wherein the pressure sensing surface is divided into a non-acting sectional surface in which a contact state between the adjusting member and the pressure sensing surface does not change irrespective of a degree of the external load and an acting sectional surface in which a contact state between the adjusting member and the pressure sensing surface changes in response to the degree of the external load applied via the adjusting member; and wherein
- a detection signal from the non-acting sectional surface is applied as a reference signal when evaluating a detection signal from the acting sectional surface.

* * * * *